A. W. PEARSALL.
PNEUMATIC DESPATCH DELIVERY TERMINAL.
APPLICATION FILED MAY 17, 1916.

1,276,699.

Patented Aug. 20, 1918.
2 SHEETS—SHEET 1.

Witnesses.
Charles O. Laurin.
A. E. Fink.

Inventor.
Albert W. Pearsall.

By Chas. P. Hidden
Attorney

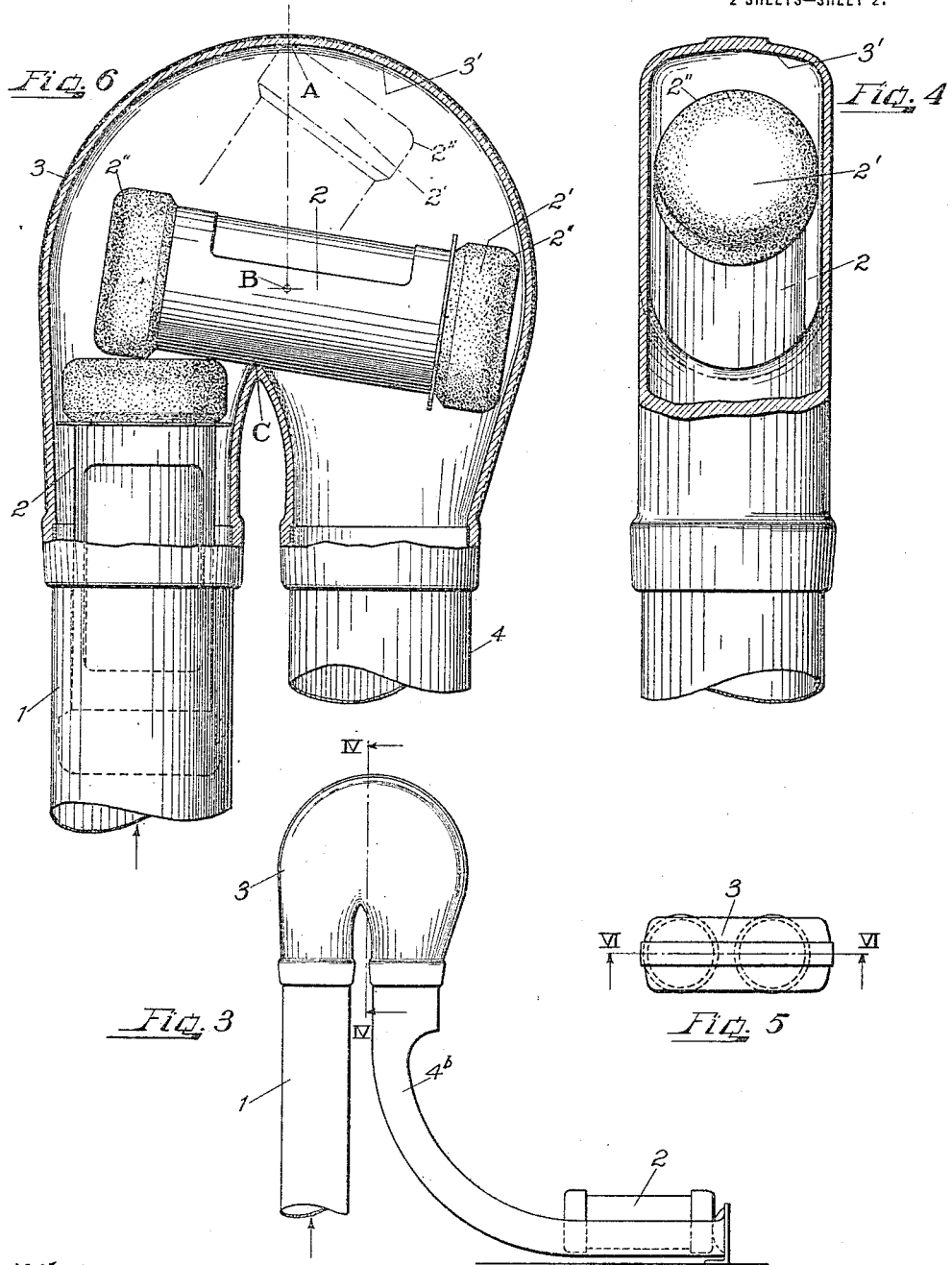

UNITED STATES PATENT OFFICE.

ALBERT W. PEARSALL, OF LOWELL, MASSACHUSETTS, ASSIGNOR TO THE LAMSON COMPANY, OF BOSTON, MASSACHUSETTS, A CORPORATION OF NEW JERSEY.

PNEUMATIC-DESPATCH DELIVERY TERMINAL.

1,276,699.  Specification of Letters Patent.  Patented Aug. 20, 1918.

Application filed May 17, 1916. Serial No. 98,186.

*To all whom it may concern:*

Be it known that I, ALBERT W. PEARSALL, a citizen of the United States, residing at Lowell, in the county of Middlesex and State of Massachusetts, have invented certain new and useful Improvements in Pneumatic-Despatch Delivery Terminals, of which the following is a specification.

This invention relates to delivery terminals for pneumatic tube systems and more particularly to a novel return bend terminal especially adapted for use for the delivery of carriers from up-delivery tubes and also for the delivery of carriers from more or less horizontally extended tubes.

The advantages residing in a terminal, constructed as hereinafter described, are many and it is believed that the present construction marks an important advance in this art, since by reason thereof the counter or other space taken up by the device in a store or the like is reduced substantially to a minimum, while the discharge of carriers therefrom may be made almost noiseless. Furthermore, the proper delivery of closely following carriers is assured and this, in the preferred form of the device, with the utmost simplicity of construction and consequent low cost of manufacture.

The smallest delivery terminal heretofore in use is known as a "pigs ear" terminal; it being adapted for up-delivery and the carrier being abruptly projected out through a very short and but slightly turned guide, to fall onto the counter often with considerable force. Indeed this contruction has given rise to accidents, while the forcible delivery of the carriers is noisy. Terminals have also been constructed with a long and relatively large radius guide somewhat in the form of an inverted U, the free end of which is usually inturned. Such terminals occupy considerable space on the counter and being large and bulky are more or less unsightly.

So far as I am aware, no one heretofore has devised a 180° return bend terminal in which any carrier traversing the same has its center of gravity but little removed from the center of curvature of the bend; the carrier turning through about 180° in practically its own length and, in effect, practically about its own center of gravity.

This improved terminal construction also, by the way, permits of the disposition of the tube delivering to the terminal and the "shelf", or discharge tube or way leading therefrom, so that these guiding members may be spaced apart but very little more from center to center than the diameter of the tubing.

These and other objects of my invention will be hereinafter referred to and the novel elements and combinations of parts whereby said objects may be attained will be more particularly pointed out in the claims appended hereto.

In the accompanying drawings which form parts hereof and in which like reference characters designate like parts throughout the several views, I have exemplified preferred constructions embodying my invention; but as I am aware of various changes and modifications which may be made herein without departing from the spirit of the invention, I desire to be limited only by the scope of said claims.

Referring to the drawings:

Fig. 3 is a similar view, but showing in connection with the return bend a short shelf adapted to be placed above a counter.

Fig. 4 is a vertical section of the return bend, taken on the line IV—IV of Fig. 3; the section being drawn to an enlarged scale.

Fig. 5 is a top view of the bend shown in Fig. 3; and

Fig. 6 is an enlarged section taken on the line VI—VI of Fig. 5.

Figure 1:
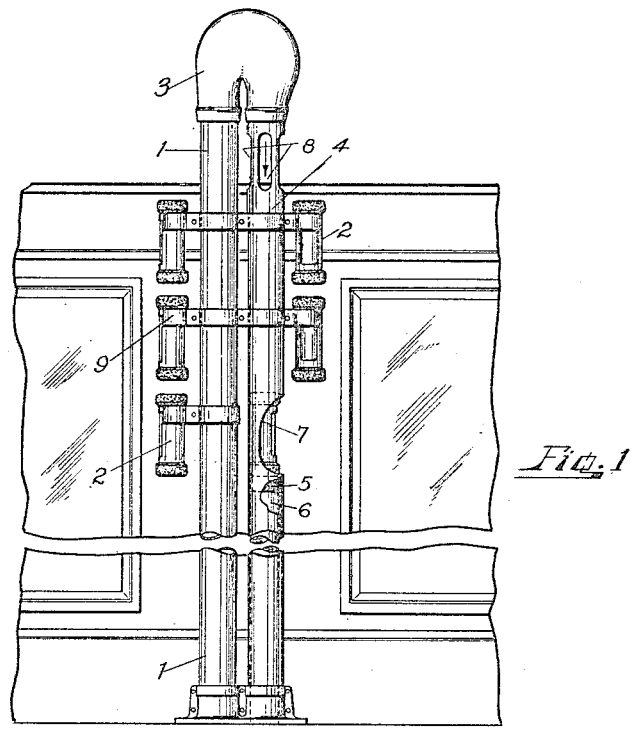
Figure 1 is a front elevation of a 180° return bend terminal located adjacent a counter to the side of which its tubes are attached.

In the construction shown in Fig. 1, the tube section 1 is connected to or forms a part of a suitable transmission line through which the carriers 2 are sent by compressed air. This tube delivers the carrier to a "bend" 3 which may conveniently be a casting recessed at one end or side thereof, for the reception of the end of the tube 1 and preferably similarly recessed at its other and reversely directed opening, for the reception of a "shelf" tube or equivalent receptacle 4, in which the carriers come to rest one behind the other.

The radius of curvature of the bend is preferably but very little larger than half the length of a carrier, as best shown in Fig. 6, while furthermore, and especially where it is desired to maintain the pressure of the air operative against the carrier while the latter is traveling around at least the upwardly extending half of the bend, as is the case for example when said pressure is relatively low,—it is preferred to shape the upper wall of the bend somewhat like a flattened or elliptical arch, as at 3' in Fig. 4, rather than perfectly arcuate in transverse cross-section; since the carrier traveling around the sharp bend does not present the cylindrical side or face of its felt heads 2' to said upper wall, but rather contacts with the latter only at the outer edges 2'' of the respective heads.

The ideal cross-section of this upper wall at the upper portion thereof is of course an ellipse, but even a fair approximation to this shape affords excellent results. The necessity for flattening the transverse arch is perhaps best realized by a consideration of the fact that the plane of the flat forward end of a carrier is located at an angle more than 45° away from the normal AB to, for example, the point A in the upper wall of the bend, as indicated in dotted lines in Fig. 6; while when the forward end of the carrier has descended to the position in which that of the tilted carrier shown in full lines in said figure, is disposed, the elliptical arch would have to be of even a more pronounced departure from the arc of a circle.

In practice, however, it has been found that the substantially elliptically arched wall shown in Fig. 4 may be carried around with nearly the same transverse cross-section, through somewhat less than 180°; the cross-section selected being a compromise between the ideal sections at different points along the curve and the wall in transverse section becoming gradually more arcuate in the immediate vicinity of the tubes 1 and 4.

The momentum of the air delivered from the tube 1 tends to maintain a slightly higher pressure in the vicinity of this wall than at its center of curvature B, and the air current thus traveling around the wall 3' will propel the carrier around the decidedly abrupt bend until it is free to drop out of the bend even by gravity alone.

To further the prompt emergence of the carrier, I greatly prefer to laterally off-set the groin C of the bend with respect to the vertical plane AB through the center of curvature of the bend, B; so that even if a carrier should fall away from the arched wall 3' into the position in which the nearly horizontally disposed carrier is shown in Fig. 6, its center of gravity would lie to the right of the supporting point C and said carrier would hence continue to rotate clockwise, as viewed in said figure, around C until it was free to drop out into the tube 4.

Should a succeeding carrier enter the bend while this preceding carrier is thus disposed, such succeeding carrier will deliver a thrust against the rear head of the first which would tend to expedite its emergence from the bend rather than to block the bend.

The action of the bend, however, in thus causing each carrier to rotate through 180°, almost within its own length and substantially about its own center of gravity, checks the carrier so effectively that it falls out of the bend into the "shelf", or receiving tube, with but little momentum and yet the close conformity of the guiding wall 3' of the bend to the feltheads of the carrier affords a sufficient air pressure against the carrier to insure its rotation to a position where gravity alone will certainly cause its proper emergence from the bend.

The receiving tube or "shelf" 4 in the construction shown in Fig. 1 extends vertically down from the bed a sufficient distance to accommodate an accumulation of a plurality of carriers therein; the first carrier coming to rest against a resilient buffer 5 of felt or the like, which may rest upon a wooden cylinder 6 in the bottom of the tube.

The lower carrier may be removed through an opening, the edge of which has been designated 7, while openings 8 may also be provided in the upper part of the tube 4 to permit the compressed air to escape after it has passed through the bend.

The carriers not in use may be supported by suitable spring clips 9 or racks from which they may be readily withdrawn.

Figure 2:
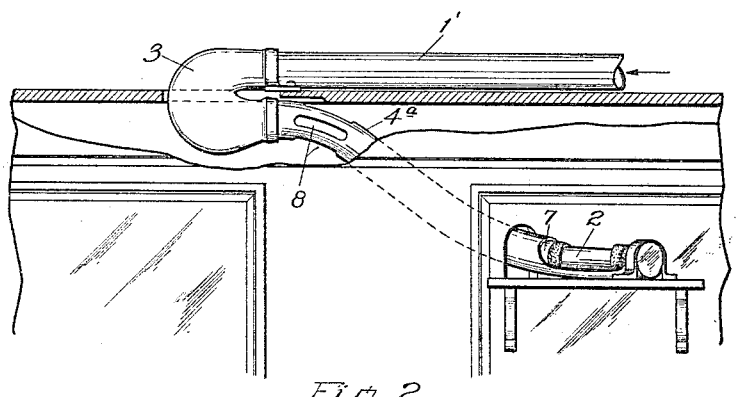
Fig. 2 is a similar terminal mounted to receive carriers from a horizontally disposed tube, for delivery laterally to a slightly lower level.

In the construction shown in Fig. 2 the tube 1' is horizontal and the bend 3 is downturned for delivery to a shelf 4ᵃ. Herein also the openings 8 are provided and the forward carrier comes to rest in a substantially horizontal position preparatory to its removal through the opening 7. In this case the sustained action of the air current on the carrier is of importance as the carrier cannot drop out of the bend but must be propelled therefrom. Unless an abnormally heavy and wasteful air current be used it is really essential in such a case that the guiding wall of the bend be substantially elliptical, as indicated, for conformity with the guide-wall engaging portions of the heads of the carriers.

In Fig. 3 the shelf 4ᵇ is of a type in common use and as the upper side thereof is cut away for nearly the entire length thereof, the openings 8, provided in the previously described shelves or carrier receivers, may be omitted.

While I have shown a 180° bend in the constructions given by way of exemplification, obviously I do not desire to be limited thereto except when in certain of the claims such specific form of apparatus is clearly indicated.

Further, while I greatly prefer to turn the carrier guiding wall of the bend through a curve the radius of which is but very little more than half the length of the carrier to be delivered through said bend, this radius may of course be made greater if the consequent enlargement of the terminal be not objected to; but in no case is said radius greater than the length of the carrier and it is greatly to be preferred that it be materially less.

Having thus described my invention what I claim is:

1. A delivery terminal for pneumatic despatch tubes comprising a bend the peripheral radius of curvature of which is less than the length of the headed carrier to be delivered through said bend, said bend having a curved guiding wall adapted for engagement simultaneously with both heads of the carrier and having further an acute groin presenting, toward the path of carriers traversing said bend, an upwardly directed edge, laterally displaced with respect to a vertical plane through the approximate center of curvature of said wall, to cause a carrier which may drop down from said wall onto said groin, to topple out of said bend on the carrier delivery side of the latter, the distance from said edge to the side of said wall first encountered by a carrier, measured in a horizontal plane, being substantially equal to one-half the length of said carrier.

2. A delivery terminal for pneumatic despatch tubes comprising a carrier-guiding bend the radius of curvature of which is so short that closely following elongated carriers traversing said bend may contact with each other while their respective axes are substantially at right angles to each other, said bend having an acute upwardly directed carrier-turning abutment therein, laterally displaced with respect to the approximate center of curvature of the bend toward the side of said bend at which carriers enter, said abutment being adapted for engagement with the side of a carrier at a point back of the center of gravity of said carrier when the latter has partly traversed said bend and having its apex below said center of curvature.

3. A delivery terminal for pneumatic despatch tubes comprising an acutely groined carrier-guiding bend the ends of which, through which carriers respectively enter and emerge, being directed in substantial parallelism and the centers of said ends being spaced apart a distance materially less than the overall length of a carrier to be guided by said bend, said bend having means to direct each carrier out through said end at which said carriers emerge with the same end foremost that first entered said bend.

4. A delivery terminal comprising an acutely groined carrier-guiding bend into which carriers enter and from which said carriers each emerge at a mouth of said terminal with the same end foremost that first entered said bend, said bend having means to direct each carrier out through said mouth with the same end thereof foremost that first entered said bend, in combination with a pneumatic despatch tube adapted to deliver carriers to said bend.

5. In pneumatic despatch tube apparatus, a despatch tube the delivery end of which extends in a determined direction, elongated carrier-receiving means the entrance to which is adjacent said end of said tube, the axes of said tube at said end thereof and of said receiving means at said entrance thereto being in substantial parallelism, and an acutely groined carrier-guiding bend to receive carriers from said tube, rotate them through substantially 180° and deliver them to said receiving means, the maximum effective width of said bend, measured in the plane in which the carriers travel around said bend, being less than three times the diameter of said tube.

6. In pneumatic despatch tube apparatus the combination of a transmission tube with a carrier-checking and momentum-absorbing bend for reducing the velocity of carriers while the latter are still subjected to the air current traversing said tube, said bend being groined at its inner side and having an outer carrier-guiding wall abruptly curved, in the direction of travel of the carriers passing said wall, through an angle of more than 90°, the approximate center of curvature of said wall being above the groin of said bend, when the groin is upwardly directed, and to the right of said groin when the entrance side of said bend is to the left of said groin.

In testimony whereof I have affixed my signature, in the presence of two witnesses.

ALBERT W. PEARSALL.

Witnesses:
ARTHUR E. HALL,
CHARLES O. LAURUE.